United States Patent [19]
Van Groningen

[11] Patent Number: 6,140,873
[45] Date of Patent: Oct. 31, 2000

[54] POWER AMPLIFIER WITH SOFT SWITCHING AND MULTILEVEL SWITCHING CELLS

[75] Inventor: Wilhelmus D.H. Van Groningen, Eindhoven, Netherlands

[73] Assignee: U.S. Philips Corporation, New York, N.Y.

[21] Appl. No.: 09/362,464

[22] Filed: Jul. 28, 1999

[30] Foreign Application Priority Data

Jul. 30, 1998 [EP] European Pat. Off. .............. 98202554

[51] Int. Cl.[7] .......................... H02M 7/5387; H03F 3/38; H03F 21/00; H03F 3/217
[52] U.S. Cl. ........................ 330/10; 330/207 A; 330/251; 363/132
[58] Field of Search .................................. 330/10, 207 A, 330/251; 363/132

[56] References Cited

PUBLICATIONS

"Imbricated cells Multi–Level Voltage Source Inverters for High Voltage Applications" by T.A. Meynard, H. Fochin EPE Journal, vol. 3, No. 2, Jun. 1993, pp. 99–106.

"The Auxiliary Resonant Commutated Pole Converter" by R.W. De Doncker and J.P. Lyons, IEEE Industry Application Society Annual Meeting, 1990, vol. 2, pp. 1228–1235.

*Primary Examiner*—Michael B Shingleton
*Attorney, Agent, or Firm*—Dwight H. Renfrew

[57] ABSTRACT

A power amplifier for delivering large currents as well as high voltages of the order of some hundreds of amperes and 1000 or more volts, notably for MRI. The amplifier is constructed as a multilevel inverter in order to comply with the requirement of high voltages while utilizing transistors capable of withstanding lower voltages only. The amplifier is arranged for soft switching, so that the switching losses at said large currents are limited.

7 Claims, 4 Drawing Sheets

POWER AMPLIFIER WITH SOFT SWITCHING AND MULTILEVEL SWITCHING CELLS

BACKGROUND OF THE INVENTION

1. Field of the Invention

The invention relates to a power amplifier for delivering large currents as well as high voltages.

2. Description of Related Art

Amplifiers of this kind can be used for a large variety of applications. Even though the invention will be described on the basis of an application in the magnetic resonance imaging (MRI) technique, notably for driving the gradient coils of an MRI apparatus, the application of the invention is by no means restricted to such a technical field.

MRI systems utilize power amplifiers for driving the coils which generate so-called gradient fields. Such gradient fields are magnetic fields having a strength which varies linearly in a given co-ordinate direction in order to define the location of the image to be formed by means of the MRI apparatus by addition of this gradient field to a strong steady, uniform field. To this end, current pulses of an intensity of the order of magnitude of more than 600 A at a voltage of the order of magnitude of more than 500 V are applied to the gradient coils, the rise time of the pulses being of the order of magnitude of 0.2 ms whereas the pulse duration is of the order of magnitude of from 1 ms to 10 ms.

Thus, in the context of the present invention large currents are to be understood to mean currents of the order of magnitude of several hundreds of amperes, and high voltages are to be understood to mean voltages of the order of magnitude of one thousand volts or more.

Nowadays there is a tendency towards shorter rise times with larger maximum currents so as to reduce the time required for the acquisition of MRI information for the formation of an MRI image; this offers advantages inter alia in respect of image sharpness and also in respect of imaging of moving objects. Because the gradient coils exhibit an inductive behavior to the driving amplifier, a higher voltage is required so as to achieve a shorter rise time of the pulses. Increasing the currents and the voltages to be supplied by the amplifier, in combination with a shorter rise time, gives rise to problems concerning the electronic components in the amplifier. Losses in the semiconductor components cause a significant development of heat, giving rise to cooling problems. These problems can be mitigated partly by using a switched inverter, that is to say an amplifier whose transistors which carry the output current are switched to be either completely turned on or completely turned off. Switching to the turned-off or turned-on state is controlled by means of a pulse width modulated (PWM) signal. The output voltage of the inverter is then determined by the duty cycle of the PMW signal.

Other problems are encountered when the desired output voltage is increased and/or the desired rise time is reduced: the desired voltage may be so high that no transistors are available or, should they be available, they have a stray capacitance which is so high that the PWM switching frequency (of the order of magnitude of 20 kHz) required for the relevant application can no longer be reached. Moreover, in the case of a high supply voltage the voltage transients at the output of the amplifier, but preceding the output low-pass filter, in response to the switching of the amplifier transistors would become so high that the higher harmonic content of the output signal would become so high that the output low-pass filter would have to satisfy very severe requirements. The latter problems can be partly mitigated by using a switched amplifier of the multilevel type (multilevel inverter).

In an inverter of this type the total voltage is distributed between two or more series-connected transistors, means being provided so as to prevent the total voltage from still being present across a single transistor due to, for example inequalities of the transistors (for example, due to individual spreads caused by manufacturing tolerances). Such means consist of one or more capacitors which are connected parallel to a part of the series connection of the transistors and always carry a more or less constant fraction of the total voltage present across the series connection of the transistors. Inverters of this kind are known per se, for example from an article in EPE Journal, Vol. 3, No. 2, June 1993, pp. 99–106, entitled "Imbricated cells Multi-Level Voltage Source Inverters for High Voltage Applications".

In these known multilevel inverters use can thus be made of transistors (generally semiconductor elements), each of which has a breakdown voltage which is lower than the total voltage present across the circuit, and hence also lower than the output voltage of the circuit. In this known circuit, however, the problem in respect of the power losses in the semiconductor components and the associated cooling problems are not solved completely, notably not in respect of the required high PWM switching frequencies. These power losses consist of switching losses and conduction losses due to the resistance of the material of the various components.

Due to the high output voltages and the high switching frequency, the switching losses usually are predominant in amplifiers for high powers and high PWM switching frequencies. Such switching losses occur because the switching transistor switches over from the turned-on to the turned-off state or vice versa. In the turned-on state the current through the transistor has a given value, but the voltage across the transistor is substantially zero or very small in any case (for example, 0.5 V); in the turned-off state the voltage across the transistor has a given value, but the current across the transistor is practically zero. During the switching-over from one state to the other, however, a product of current and voltage occurs; this implies power dissipation.

It is known per se to reduce switching losses by means of a so-called "soft switching" technique. When this technique is used, the instant of the transition from the turned-on state to the turned-off state or vice versa (the switching) is chosen in such a manner that either the current through the switch is zero or practically zero ("Zero Current Switching") or the voltage across the switch is zero or practically zero ("Zero Voltage Switching"). Thus, the product of current and voltage is substantially zero in both cases. Inverters operating with such a switching mode are known per se, for example from an article in "Conference Record of the IEEE Industry Application Society Annual Meeting", 1990, Vol. 2, pp. 1228–1235, entitled "The Auxiliary Resonant Commutated Pole Converter". The inverters disclosed in the latter article, however, are not of the multilevel type, so that the described problems in respect of the high voltages are not solved.

SUMMARY OF THE INVENTION

It is an object of the invention to provide a power amplifier of the inverter type for delivering large currents as well as high voltages, which amplifier utilizes semiconductor switches having a breakdown voltage which is lower than the supply voltage and involves only slight switching losses occur. A power amplifier of this kind includes a cascade of multilevel switching cells, each multilevel switching cell including an input and an output and being provided with two controllable switches, with a respective diode which is connected antiparallel thereto, said diodes being connected in mutually opposed forward directions, each time one end of the two switches constituting one of the input terminals of the switching cell and the other ends of the two switches forming the output terminals of the switching cell, said switching cells forming a cascade in that the output terminals of a preceding switching cell are connected to the input terminals of a subsequent switching cell, a capacitor being connected between said interconnected input terminals and output terminals and a power supply source being connectable to said cascade of switching cells, said amplifier also including an inductive element one end of which is connected to the output of the amplifier, and at least two controllable switches which are connected to the other end of the inductive element, a first one of said switches being connected to a point carrying a voltage which is higher than the output voltage of the amplifier whereas a second switch is connected to a point carrying a voltage which is lower than the output voltage of the amplifier.

In the cited article "Imbricated cells ... etc.", notably in FIG. 4 thereof, each multilevel switching cell consists of two associated transistors with a diode connected antiparallel thereto. In this context an "antiparallel connected diode" is to be understood to mean a diode which is connected parallel to the main current path of the transistor and whose forward direction opposes that of the main current path of the transistor. Each of the controllable switches is formed by a respective transistor whose base constitutes the control input. The input of such a multilevel switching cell is formed by two terminals, the first of which is formed by the junction of the cathode of a diode and the collector of the associated transistor, the second terminal being formed by the junction of the anode of the other diode and the emitter of the associated transistor. The output of such an element is formed by two terminals, the first of which is formed by the junction of the anode of the first diode and the emitter of the first transistor whereas the second terminal is formed by the junction of the cathode of the other diode and the collector of the associated transistor.

Between the interconnected input terminals and output terminals there is connected a capacitor which is and remains charged during operation in such a manner that across this capacitor there is present a voltage which amounts to a substantially fixed fraction of the supply voltage, i.e. the voltage originating from the power supply source to be connected. Consequently, not the full supply voltage is present across each transistor and in order to build a switched power supply intended to form a power amplifier it suffices to use transistors having a breakdown voltage which is lower than the input voltage of the amplifier to be switched. For example, in the case of a cascade comprising two stages, approximately half the supply voltage is present across said capacitor, so that in all cases no more than approximately half the supply voltage will be present across each transistor. If the number of stages is larger, a lower fraction will be present across each of the capacitors, so that for each transistor also a lower fraction of the input voltage remains.

In order to solve said problems concerning the power losses (so the dissipation in the switching transistors) due to the high output voltages, in accordance with the invention a capacitor is connected parallel to each controllable switch, the amplifier also being provided with an inductive element, one end of which is connected to the output of the amplifier, and with at least two controllable switches which are connected to the other end of the inductive element, a first resonant switch of said switches being connected to a point carrying a voltage which is higher than the output voltage of the amplifier whereas a second resonant switch is connected to a point carrying a voltage which is lower than the output voltage of the amplifier.

These steps ensure a resonant switching procedure for the switching transistors, so that the instant of switching of these transistors can be chosen in such a manner that at that instant the voltage thereacross or the current therethrough is zero. A resonant switching procedure is to be understood to mean a procedure in which such a currentless or voltageless state is reached in that a resonant circuit is formed by the capacitors, connected parallel to the switches, and said inductive element. Said switches, in this case called resonant switches, control the current distribution of the current through the inductive element in such a manner that the desired currentless or voltageless state is obtained at the desired instants. Thus, the invention innovatively combines the multilevel inverter technique with the soft switching technique.

The power amplifier in an embodiment of the invention is provided with a third controllable resonant switch which is connected to the other side of the inductive element and to a point carrying substantially half the supply voltage. This offers a further refinement of the voltage with which the current through the inductive element is switched so that the desired zero level of the current or the voltage is reached faster; this step can also be taken to ensure that the power dissipation in the resonant switches is reduced because the current or voltage to be switched is thus lower.

In a further embodiment of the invention a capacitor is connected parallel to each of the resonant switches in the power amplifier. This step also yields "soft switching" of the resonant switches, offering an additional gain in respect of the dissipation of the amplifier, notably in the case of high powers.

In another embodiment of the invention, the point with substantially half the supply voltage in the power amplifier is realized by voltage division by means of two capacitors connected between the points whereto a power supply source can be connected. It would be feasible to derive half the supply voltage from a separate power supply apparatus, or by means of a resistance voltage divider. Both feasible solutions have their own drawback: separate power supply apparatus are expensive and comparatively vulnerable, and resistors dissipate power. The step according to the invention, however, ensures that only little power is lost whereas the desired point with half the supply voltage can still deliver current with a low impedance. Because these capacitors participate in the resonant process, they are charged or discharged during operation in such a manner that the junction of the two capacitors is always driven to half the supply voltage.

The power amplifier in another embodiment of the invention is provided with a cascade of n multilevel switching cells and with n supply points, the $i^{th}$ supply point delivering a voltage substantially equal to i/n times the voltage from the power supply source, the amplifier furthermore being provided with n controllable resonant switches which are connected to the other side of the inductive element, the $i^{th}$ switch of the resonant switches being connected to the $i^{th}$ supply point. As a result of this step, the principle of the invention is further generalized to an n-level amplifier whose resonant process is driven from n equidistant voltages. The amount of power lost is thus further minimized and the ripple on the output signal of the amplifier becomes much smaller, so that the output low-pass filter need only satisfy less severe requirements.

The power amplifier in a further embodiment of the invention is provided with a capacitor which is connected parallel to each of the resonant switches. This step ensures that soft switching of the resonant switches is also achieved in the generalized form of the power amplifier, yielding an additional gain in respect of the dissipation of the amplifier, notably in the case of high powers.

BRIEF DESCRIPTION OF THE DRAWING

The invention will be described in detail hereinafter with reference to the Figures in which corresponding reference numerals denote corresponding elements. Therein.

DETAILED DESCRIPTION OF THE PREFERRED EMBODIMENT

Figure 1:
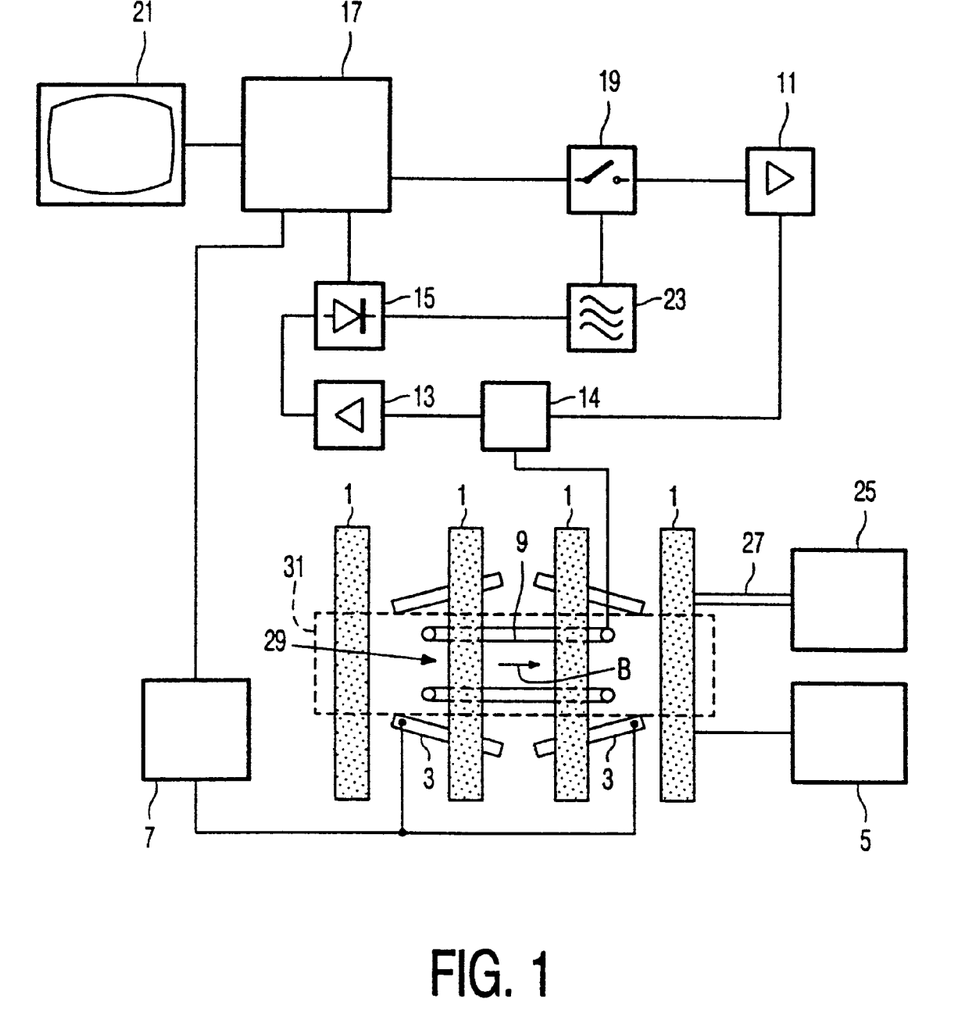
FIG. 1 shows diagrammatically the general construction of a magnetic resonance apparatus.

The magnetic resonance imaging apparatus which is diagrammatically shown in FIG. 1 includes a first magnet system 1 for generating a steady magnetic field B, a second magnet system 3 (the gradient coil system) for generating magnetic gradient fields, a power amplifier 7 for the gradient coil system 3, and a power supply source 5 for the first magnet system 1. An RF coil 9 serves to generate an RF magnetic alternating field; to this end it is connected to an RF transmitter device which includes an RF source 11. The RF coil 9 can also be used for the detection of spin resonance signals generated by the RF transmitter field in an object to be examined (not shown); to this end, this coil is connected to an RF receiver device which includes a signal amplifier 13. The output of the signal amplifier 13 is connected to a detector circuit 15 which is connected to a central control device 17. The central control device 17 also controls a modulator 19 for the RF source 11, the power amplifier 7 and a monitor 21 for image display. An RF oscillator 23 controls the modulator 19 as well as the detector 15 processing the measuring signals. For the cooling of the magnet coils of the first magnet system 1 there is provided a cooling device 25 which includes cooling ducts 27. The RF coil 9, being arranged within the magnet systems 1 and 3, encloses a measuring space 29 which, in the case of an apparatus for medical diagnostic measurements, is large enough to accommodate a patient to be examined or a part of the patient to be examined, for example the head and the neck. Thus, a steady magnetic field B, gradient fields for the selection of object slices, and a spatially uniform RF alternating field can be generated in the measuring space 29. The RF coil can combine the functions of transmitter coil and measuring coil, in which case a separating circuit 14 is provided so as to separate the forward and return signal traffic. However, different coils can also be used for these two functions; for example, surface coils then act as measuring coils. If desired, the coil 9 may be enclosed by an RF field shielding Faraday cage 31.

Figure 2:
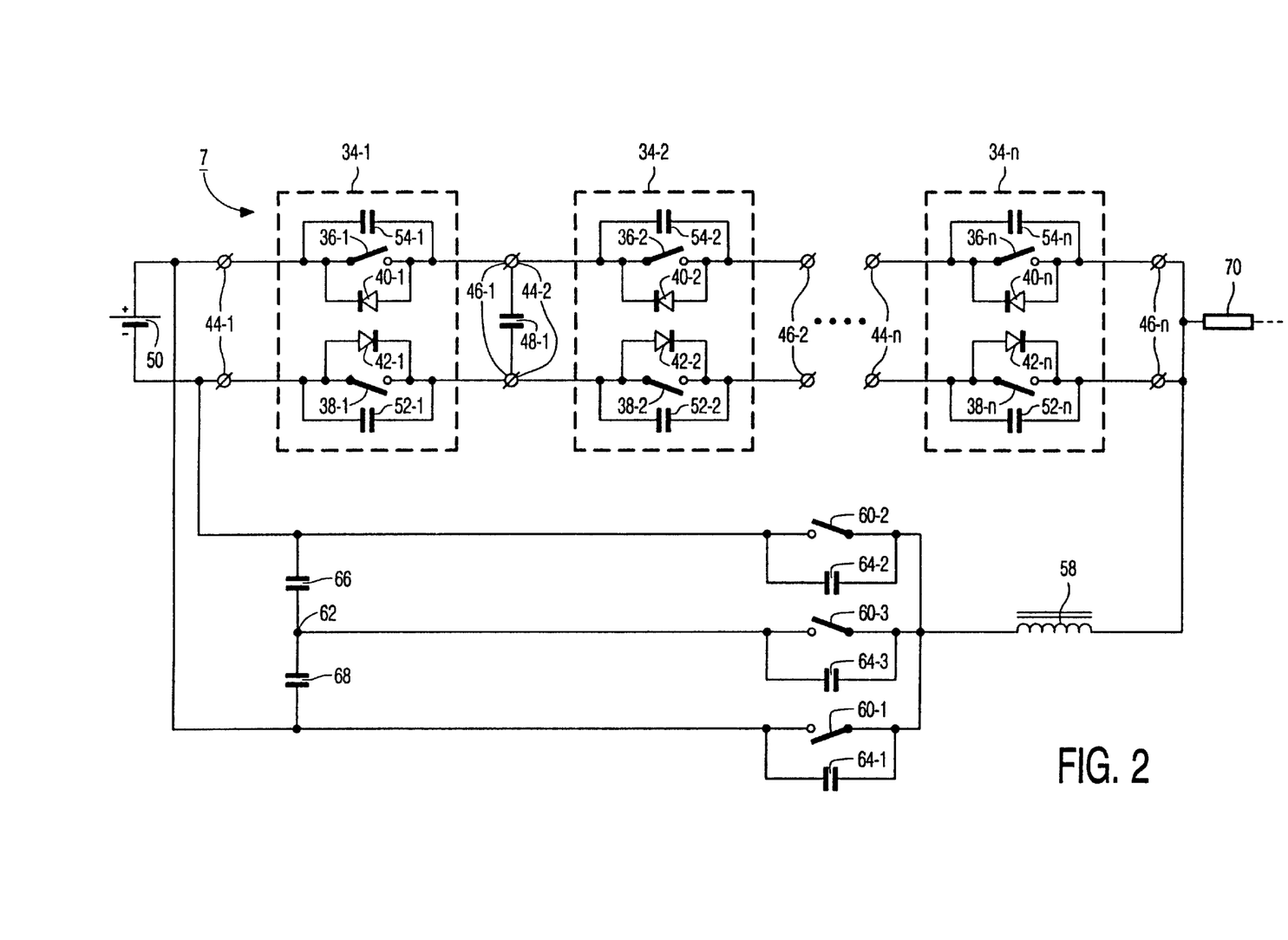
FIG. 2 shows a first embodiment of the power amplifier according to the invention.

FIG. 2 shows a power amplifier 7 according to the invention as can be used for the power supply of the gradient coil system 3 shown in FIG. 1. The power amplifier includes a cascade of n multilevel switching cells (34), only the switching cells 34-1, 34-2 and 34-n thereof being shown in the Figure. All switching cells have the same construction; therefore, the construction of the switching cells will be described on the basis of one switching cell, i.e. the switching cell 34-1. Two controllable switches 36 and 38 are connected between the input 44 and the output 46 of the switching cell. These controllable switches are preferably constructed as a semiconductor element of a suitable form, for example a thyristor or an IGBT transistor (Insulated Gate Bipolar Transistor), the latter being particularly suitable for switching large currents at high voltages. A diode 40, 42 is connected antiparallel to each of the transistors 36 and 38, which means that this diode is connected parallel to the main current path of the associated transistor; however, its forward direction opposes that of the transistor. The two diodes 40 and 42 are also connected so as to have a mutually opposed forward direction. Furthermore, a respective capacitor 52, 54 is connected parallel to each controllable switch 36, 38. The input 44 of the switching cell 34 thus consists of two connection terminals, one of which is formed by one of the connection points of said parallel connected elements 36, 40 and 54 whereas the other input terminal is formed by one of the connection points of said parallel connected elements 38, 42 and 52. The output 46 of the switching cell 34 also consists of two connection terminals, one of which is formed by the other connection point of said parallel connected elements 36, 40 and 54 whereas the other output terminal is formed by the other connection point of said parallel connected elements 38, 42 and 52.

The switching cells 34-1 to 34-n are combined so as to form a cascade by connecting the output terminals 46 of a preceding switching cell (for example, 34-1) to the input terminals 44 of a subsequent switching cell 34-2. The input 44 is connected to the output 46 by interconnecting the corresponding connection terminals of the input and the output. A capacitor 48 is connected between the set of terminals consisting of the input terminal and the corresponding output terminal thus interconnected on the one side and the other set of terminals on the other side. A power supply source 50 is also connected to the cascade of switching cells.

The amplifier 7 is also provided with a self-inductance 58, one side of which is connected to the output 46-n of the amplifier. A parallel connection of three switches 60-1, 60-2 and 60-3 is connected to the other side of the self-inductance 58. Hereinafter these switches will be referred to as resonant switches because of their function (to be described hereinafter) concerning the resonant phenomenon during the soft switching of the transistors of the power amplifier which carry the output current. The first (60-1) of these three resonant switches is connected to the positive side of the supply source 50, so to a point carrying a voltage which is higher than the output voltage of the amplifier (i.e. the voltage at the output 46-n); the second switch 60-2 is connected to the negative side of the supply source 50, so to a point carrying a voltage which is lower than the output voltage of the amplifier. Between the positive side and the negative side of the power supply source 50 there is connected a series connection of two identical capacitors 66 and 68; the connection point 62 of this series connection thus constitutes a point carrying substantially half the supply voltage. The third resonant switch 60-3 is connected between the self-inductance 58 and the connection point 62.

A load 70 is connected to the output 46-n of the amplifier 7. When the amplifier is used in an MRI apparatus, the gradient coil to be fed forms part of said load. However, in a "switched inverter" a low-pass filter for removing the switching frequency from the supply signal is customarily connected between the output of the amplifier and the impedance to be fed. In this case it is assumed that this low-pass filter forms part of the load 70.

It is to be noted that the amplifier shown in FIG. 2 could constitute only one half of the overall amplifier whereby the gradient coil is driven. This is the case when the load 70 is to be supplied with a current in two directions. In that case an identical amplifier section is situated to the other side of the load 70, so that the overall amplifier is formed by two half bridges, one of which is shown in FIG. 2. However, the foregoing does not have any bearing on the principle of the invention.

In order to clarify the soft switching in a switched amplifier, such soft switching will first be illustrated with reference to FIG. 3, which shows a switched amplifier which is not of the multilevel type, i.e. an amplifier in which the total voltage is not distributed between two or more series-connected transistors. Thus, therein the total voltage is present across one transistor only.

Figure 3:
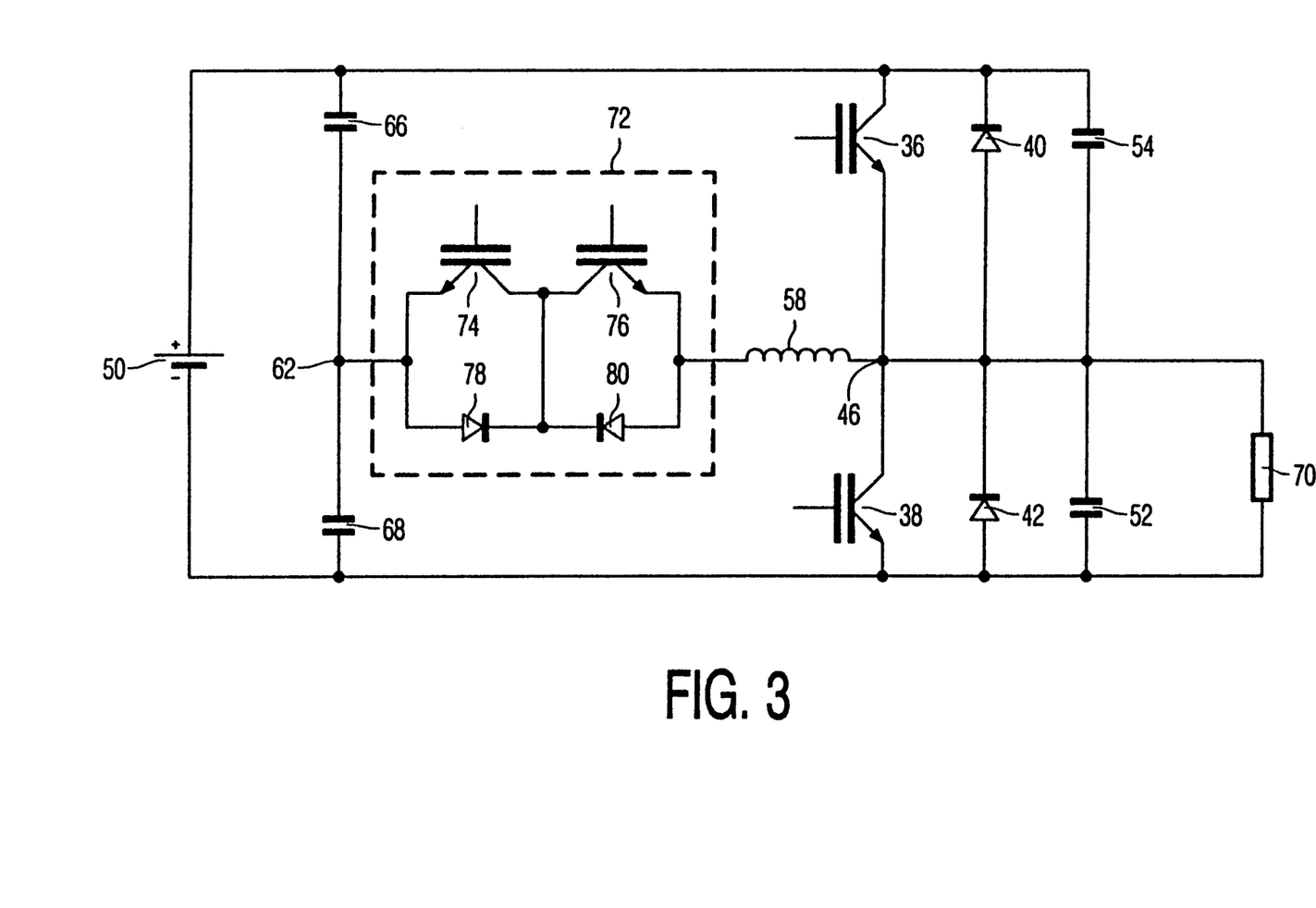
FIG. 3 shows, in order to illustrate the principle of soft switching, an amplifier which is not constructed as a multilevel inverter.

FIG. 3 shows a so-called half bridge for feeding the load 70. In comparison with FIG. 2, in this half bridge the transistors 36-1 to 36-n and 38-1 to 38-n have been replaced by the transistors 36 and 38, respectively; the diodes 40-1 to 40-n and 42-1 to 42-n have been replaced by the diodes 40 and 42, respectively, and the capacitors 52-1 to 52-n and 54-1 to 54-n have been replaced by the capacitors 52 and 54, respectively. The combination formed by the resonant switches 60-1, 60-2 and 60-3 and the capacitors 64-1, 64-2 and 64-3 has been replaced by the circuit 72. The circuit 72 consists of two parallel branches, the first parallel branch consisting of a series connection of two transistors 74 and 76 which are connected so as to have opposed forward directions whereas, the second parallel branch consists of a series connection of two diodes 78 and 80 which are also connected so as to have opposed forward directions.

Three situations will be considered in order to illustrate the soft switching in the circuit shown in FIG. 3: (I) switching over from the diode 42 conductive to the transistor 36 conductive; (II) switching over from the transistor 36 conductive to the diode 42 conductive in the case of small currents; (III) switching over from the transistor 36 conductive to the diode 42 conductive in the case of large currents.

In the situation I it is assumed that the transistors 36 and 38 and the diode 40 are not conductive ("off"), that the diode 42 is conductive ("on"), and that the transistor 36 is turned on ("is switched on"). In this starting situation a current flows through the diode 42 to the load 70 via the output 46. In order to start the switching process, the transistor 76 is switched on. As a result, half the supply voltage of the point 62 appears across the self-inductance 58. The current through the self-inductance 58 then increases linearly in time. During this period the transistor 38 is switched on but it does not conduct current while the current through the diode 42 decreases linearly. The current through the load 70 is then assumed to be constant.

When the current through the self-inductance 58 becomes larger than the current through the load 70, the so-called boost phase commences. The current through the diode 42 becomes zero (diode 42 is switched off) and the current through the transistor 38, being the boost current, then becomes equal to the current through the self-inductance 58 minus the current through the load 70. The boost current through the transistor 38 increases linearly in time, so that the duration of the boost phase (and hence the value of the boost current) can be controlled with a simple time delay. It is to be noted that the direction of the recovery current in the diode 42 is such that this current also adds boost energy and hence contributes to the switching process.

When the boost current reaches the desired value, the transistor 38 is switched off so that the resonant switching phase commences. The voltage at the output 46 abandons the value of the negative supply voltage and swings to the positive supply voltage because the current flowing through the transistor 38 flows to the resonant capacitors 52 and 54 during switching off. If the transistor 38 still has a tail current, switch-off losses will occur. During this phase the current through the self-inductance 58 consists of a half period of a sinusoidal current superposed on a DC load current.

When the voltage at the output 46 tends to exceed the positive supply voltage, the so-called clamping phase commences. The diode 40 is then polarized in the forward direction, so that the output 46 is connected to the positive supply voltage. At that instant the transistor 36 is switched on without switching losses. The residual boost energy still present in the self-inductance 58 then disappears to the capacitors 66 and 68 because the current through the self-inductance 58 decreases linearly as imposed by the half supply voltage at the point 62.

When the current through the self-inductance 58 becomes smaller than the current through the load 70, the so-called ramp down phase commences; the current through the self-inductance 58 still decreases during this phase. The current through the load 70 is then taken over by the transistor 36.

The switching procedure ends when the current through the self-inductance 58 becomes zero and the transistor 76 is switched off.

In the situation II (switching over from the transistor 36 switched on to the diode 42 switched on for small currents) it is assumed that the transistor 36 is switched on, that the other transistors and diodes are not switched on, and that the transistor 36 is switched off so that the diode 42 takes over the current.

In order to start the switching process, the transistor 74 is switched on. As a result, half the supply voltage as present at the point 62 will appear across the self-inductance 58. The boost phase of the switching process then commences immediately, so that the current through the self-inductance 58 increases linearly in time. This boost current again serves to start the resonant cycle by supplying a sufficient amount of energy for bridging the losses occurring during the switching phase. During this boost phase the boost current plus the current through the load 70 flows through the transistor 36, so that the current through this transistor is briefly increased. (It is to be noted that this procedure holds for small load currents, i.e. when the current through the load 70 is much smaller than the maximum current through the transistor 36, so that an increase of the current does not lead to additional loading of the switching transistor.)

When the boost current reaches the desired value, the transistor 36 is switched off so that the resonant switching phase commences. The voltage at the output 46 abandons the value of the positive supply voltage and swings to the negative supply voltage; the current flowing through the transistor 36 during switching off is then taken over by the resonant capacitors 52 and 54. During this phase the current through the self-inductance 58 consists of a half period of a sinusoidal current superposed on the boost current.

The so-called clamping phase commences when the voltage at the output 46 tends to drop below the negative supply voltage. As a result, the diode 42 is polarized in the forward direction, so that the output 46 is connected to the negative supply voltage. At that instant the transistor 38 is switched on without switching losses. The residual boost energy still present in the self-inductance 58 disappears to the capacitors 66 and 68 because the current through the self-inductance 58 decreases linearly as imposed by the half supply voltage at the point 62.

The switching procedure ends when the current through the self-induction 58 becomes zero and the transistor 74 is switched off. The full current through the load 70 then flows through the diode 42.

In the situation III (switching over from the transistor 36 swiched on to the diode 42 switched on for large currents) it is assumed that the transistor 36 is conductive, that the other transistors and diodes are not conductive, and that the transistor 36 is switched off so that the diode 42 takes over the current.

The procedure for the situation III deviates significantly from that for the situation II, because the circuit 72 is no longer used. In this case the current through the load suffices to drive the output voltage from the positive supply voltage value to the negative value. When the current through the transistor 36 is larger than a predetermined threshold value, the transistor 74 is not switched on but the transistor 36 is switched off directly.

The voltage at the output 46 decreases linearly in time until it drops below the negative supply voltage. The diode 42 is then polarized in the forward direction, so that it takes over the full load current. This ends the switching procedure.

The operation of the power amplifier according to the invention will be described in detail with reference to FIG. 4. This Figure shows a power amplifier according to the invention which is constructed in the form of a multilevel inverter with soft switching. The soft switching in this amplifier is used for switching over the power transistors as well as for switching over the transistors for controlling the resonant elements for realizing the soft switching.

Figure 4:
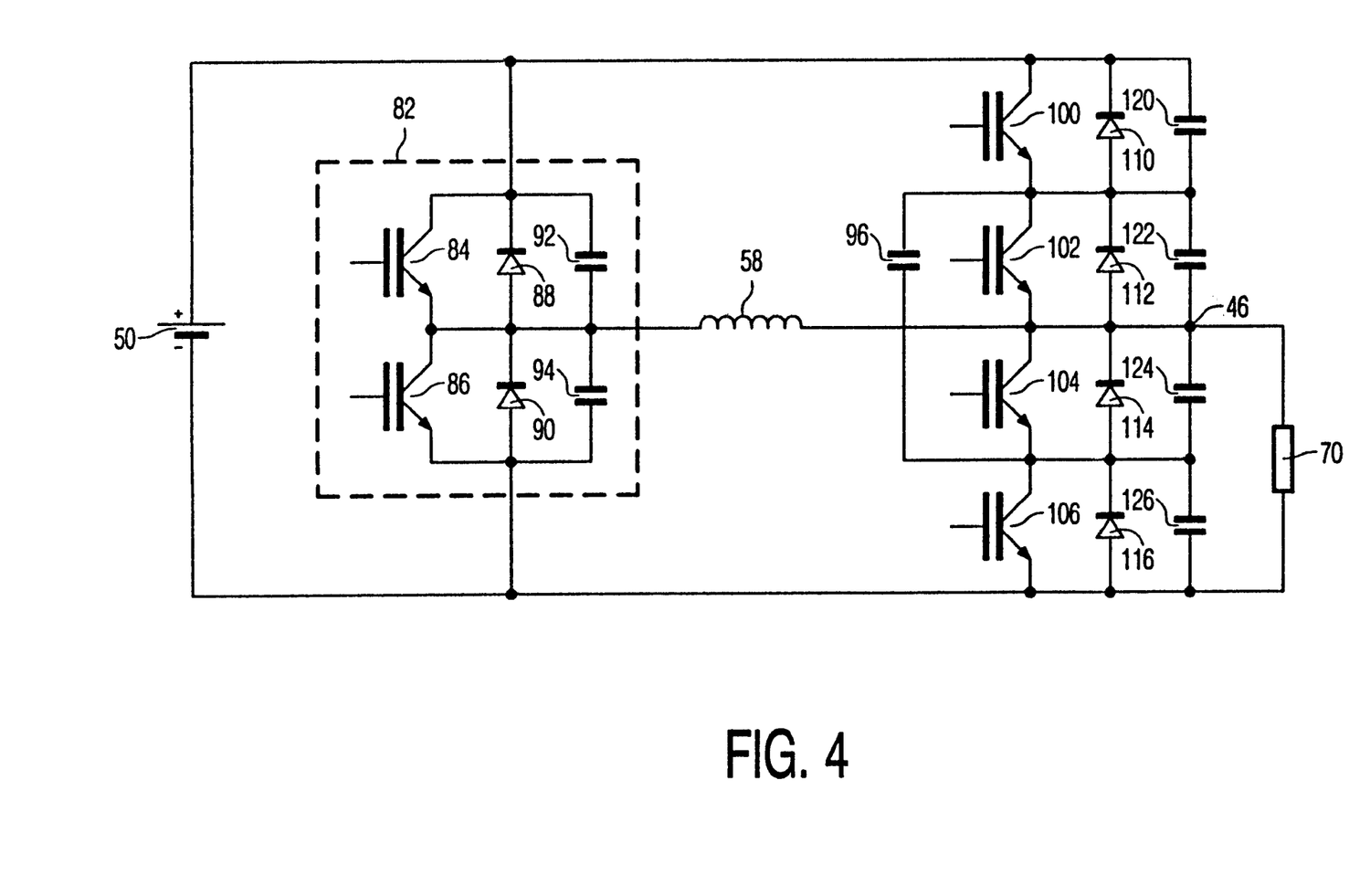
FIG. 4 shows a second embodiment of the power amplifier according to the invention.

FIG. 4 shows a version of the power amplifier shown in FIG. 2. The transistors 100, 102, 104 and 106 in FIG. 4 correspond to the transistors 36-1, 36-2, 38-2 and 38-1, respectively; the diodes 110, 112, 114 and 116 in FIG. 4 correspond to the diodes 40-1, 40-2, 42-2 and 42-1, respectively, and the capacitors 120, 122, 124 and 126 in FIG. 4 correspond to the capacitors 54-1, 54-2, 52-2 and 52-1, respectively. The capacitor 96 in FIG. 4 corresponds to the capacitor 48-1 of FIG. 2.

The combination of the resonant switches 60-1, 60-2 and 60-3 and the capacitors 64-1, 64-2 and 63-3 of FIG. 1 has been replaced by the circuit 82. The circuit 82 consists of three parallel branches; the first parallel branch consists of a series connection of two transistors 84 and 86 which are connected in the same forward direction and constitute the resonant switches; the second parallel branch consists of a series connection of two diodes 88 and 90 which are connected in the same forward direction and the third parallel branch consists of a series connection of two resonant capacitors 92 and 94. The soft switching process in the power amplifier shown in FIG. 4 will be described on the basis of a switching example, in this case being the switching over from the diode 114 to the transistor 102. This switching example is also representative of other switching situations. It is assumed that the current through the load 70 is constant during switching over.

It is also assumed that the transistor 100 and the diode 114 are conductive, so that the output current flows through said elements. The output current then also flows through the capacitor 96. The capacitor 96 serves to maintain approximately half the supply voltage between the emitter of the transistor 100 and the collector of the transistor 106, so that no more than approximately half the supply voltage can ever arise across each of the transistors 100, 102, 104, and 106. The transistor 104 is also switched on for reasons to be explained hereinafter, but for the time being no current will flow therethrough.

The switching process is started in that the transistor 84 is switched on. As a result, the positive supply voltage appears across the self-inductance 58, so that the current through the self-inductance 58 increases linearly in time. A current then flows from the positive side of the power supply source 50 through successively the transistor 84, the self-inductance 58, the diode 114, the capacitor 96 and the diode 110 and back to the power supply source 50; the current originating from the diode 114 is also branched to the load 70. Even though it looks in FIG. 3 as if the diode 114 is connected in the reverse direction and hence cannot conduct said current, said current in reality has the appearance of a decrease of the output current which already flows through the diode 114 and passes through the diode in the forward direction.) When the current through the self-inductance 58 tends to become larger than the current through the load 70, the current through the diode 114 becomes equal to zero and is taken over by the transistor 104 which thus switches over in response to the current zero. It is also necessary to sustain a current through the transistor 104, because the output voltage at the point 46 must be raised from half to the full supply voltage. This transition is enabled by the charging and discharging of the capacitors 122 and 124, respectively; this takes place by way of the inductive energy stored in the self-inductance 58 which, therefore, must be sufficient so as to increase the voltage across said capacitors to half the supply voltage.

When a sufficient amount of boost energy has been stored in the self-inductance 58 so as to charge and discharge the capacitors 122 and 124, respectively, to such an extent that the voltage jump from half to full supply voltage can be made at the output 46, the transistor 104 is switched off. The boost energy stored in the self-inductance 58 is then used to discharge the capacitor 122 and to charge the capacitor 124. A current then flows through the transistor 84 and the self-inductance 58, which current is subsequently branched between said capacitors and the load.

The resonant state is terminated when the voltage across the capacitor 122 has become zero and the diode 112 takes over the inductor current, so that the voltage across the capacitor 124 is maintained at half the supply voltage. When the voltage across the capacitor 122 has become zero, the current through the self-inductance 58 is also maintained at the value of that instant. After the resonant switching over, the boost current through the self-inductance 58 continues to flow through the transistor 84 and the diodes 112 and 110. This freewheeling current is sustained for as long as the transistor 84 remains conductive.

The transistor 84 is switched off at the instant of occurrence of said freewheeling current situation. As a result, the current through the self-inductance 58 is very quickly taken over by the diode 90. During this phase a counter voltage amounting to the supply voltage appears across the self-inductance 58. As a result, at a given instant during this phase the current through the self-inductance 58 becomes lower than the output current, so that the switching over from the diode 112 to the transistor 102 takes place naturally under zero voltage conditions. When finally the current through the self-inductance 58 has become zero, the diode 90 will be naturally switched off under zero current conditions. The soft switching over from the diode 114 to the transistor 102 thus having been realized, the load current flows from the positive side of the power supply source 50 to the output 46 via the transistors 100 and 102.

Considering the described switching example, to those skilled in the art it will be evident how other switching situation will be dealt with.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A power amplifier comprising:
   a cascade of multilevel switching cells, wherein each multilevel switching cell includes
      an input and an output,
      two controllable switches, each switch with a respective diode which is connected antiparallel thereto, said diodes being connected in mutually opposed forward directions, wherein one end of each one of the two switches constitutes the input terminals of the switching cell, and the other ends of the two switches form the output terminals of the switching cell, and wherein said cascade of switching cells is formed in that the output terminals of a preceding switching cell are connected to the input terminals of a subsequent switching cell, and
      a capacitor connected parallel to each controllable switch, the power amplifier further comprising
         a capacitor connected between each pair of said interconnected input terminals and said interconnected output terminals,
         a power supply source being connectable to said cascade of switching cells,
         an inductive element, one end of which is connected to the output of the amplifier, and
         at least a first and a second controllable resonant switch which are connected to the other end of the inductive element, wherein the first one of said resonant switches is connected to a point carrying a voltage which is higher than the output voltage of the amplifier whereas the second switch is connected to a point carrying a voltage which is lower than the output voltage of the amplifier.

2. A power amplifier as claimed in claim 1, further comprising a third controllable resonant switch which is connected to the other end of the inductive element and to a point carrying a voltage which is substantially equal to half the supply voltage.

3. A power amplifier as claimed in claim 1 further comprising a capacitor connected parallel to each of the resonant switches.

4. A power amplifier as claimed in claim 2, wherein the point carrying substantially half the supply voltage is realized by voltage division by means of two capacitors connected between points whereto a power supply source can be connected.

5. A power amplifier as claimed in claim 1 further comprising:
   n supply points, the $i^{th}$ supply point supplying a voltage amounting to substantially i/n times the voltage of the power supply source, and
   n controllable resonant switches which are connected to the other side of the inductive element, wherein the $i^{th}$ resonant switch is connected to the $i^{th}$ supply point.

6. A magnetic resonance imaging apparatus comprising
   a gradient coil system for generating a magnetic gradient field in a measuring space of the apparatus, and
   a power amplifier for supplying the gradient coil system with power signals in order to generate the magnetic gradient field, wherein the power amplifier is as claimed in claim 1.

7. The amplifier of claim 2 further comprising a capacitor connected parallel to each of the resonant switches.

* * * * *